US 9,956,846 B2

(12) United States Patent
Bailey

(10) Patent No.: US 9,956,846 B2
(45) Date of Patent: May 1, 2018

(54) PARTIAL RECIRCULATION VEHICLE HVAC SYSTEM

(71) Applicant: DENSO International America, Inc., Southfield, MI (US)

(72) Inventor: Raymond Bailey, Roseville, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days. days.

(21) Appl. No.: 14/745,682

(22) Filed: Jun. 22, 2015

(65) Prior Publication Data
US 2015/0283877 A1 Oct. 8, 2015

Related U.S. Application Data

(62) Division of application No. 11/385,002, filed on Mar. 20, 2006.

(51) Int. Cl.
*B60H 1/00* (2006.01)
(52) U.S. Cl.
CPC ..... *B60H 1/00849* (2013.01); *B60H 1/00564* (2013.01); *B60H 2001/00085* (2013.01)
(58) Field of Classification Search
CPC ....................................................... B60H 1/00
USPC .......................... 454/121, 139, 141, 139.141
See application file for complete search history.

(56) References Cited

U.S. PATENT DOCUMENTS

| | | | | |
|---|---|---|---|---|
| 4,802,405 A | * | 2/1989 | Ichitani et al. | 454/75 |
| 6,239,694 B1 | * | 5/2001 | Honda et al. | 340/457 |
| 6,568,468 B1 | * | 5/2003 | Uemura et al. | 165/203 |
| 6,786,816 B2 | | 9/2004 | Murakami et al. | |
| 7,357,176 B2 | | 4/2008 | Yelles | |
| 2002/0025772 A1 | * | 2/2002 | Egami et al. | 454/121 |
| 2003/0056529 A1 | * | 3/2003 | Kakehashi et al. | 62/186 |
| 2003/0056531 A1 | * | 3/2003 | Nishida et al. | 62/244 |
| 2004/0031279 A1 | * | 2/2004 | Kamiya et al. | 62/244 |
| 2004/0067728 A1 | * | 4/2004 | Murakami et al. | 454/139 |
| 2004/0170537 A1 | * | 9/2004 | Hara | 422/122 |
| 2006/0086495 A1 | * | 4/2006 | Yelles | B60H 1/3208 165/271 |

OTHER PUBLICATIONS

English translation of the Office Action dated Oct. 18, 2011 in the corresponding JP Application No. 2007-065696.

* cited by examiner

*Primary Examiner* — Steven B McAllister
*Assistant Examiner* — Samantha Miller
(74) *Attorney, Agent, or Firm* — Harness, Dickey & Pierce, P.L.C.

(57) ABSTRACT

A blower unit for a vehicle heating, venting, and air conditioning (HVAC) unit is disclosed. The blower unit includes a case member that defines at least one exterior air intake aperture and at least one interior air intake aperture. The blower unit also includes a sealing member, a first door, and a second door. The first and second doors can move independent of each other. The first and second doors can be positioned in a mixture position to allow air flow into the blower unit through both the exterior and interior air intake apertures. The first door, in the mixture position, is sealed against the sealing member. As such, the first door and the sealing member cooperate to reduce air flow out of the blower unit through the interior air intake aperture.

6 Claims, 4 Drawing Sheets

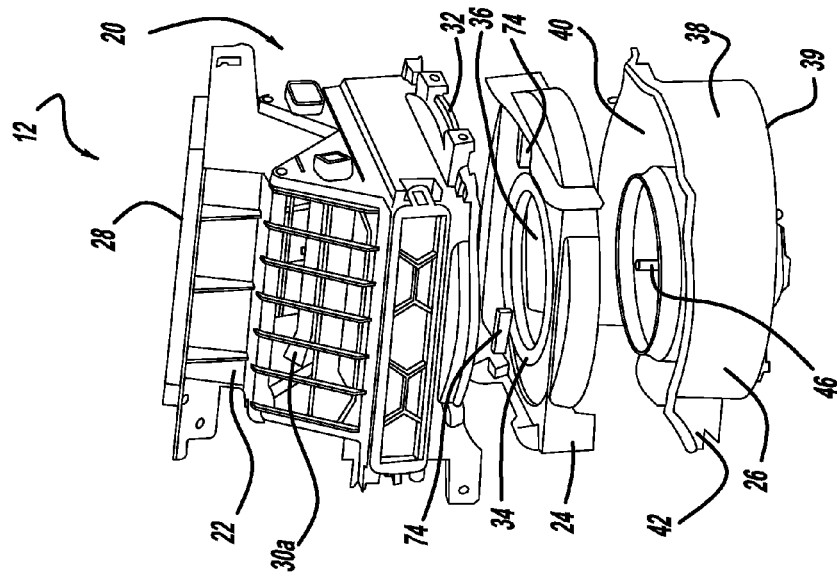
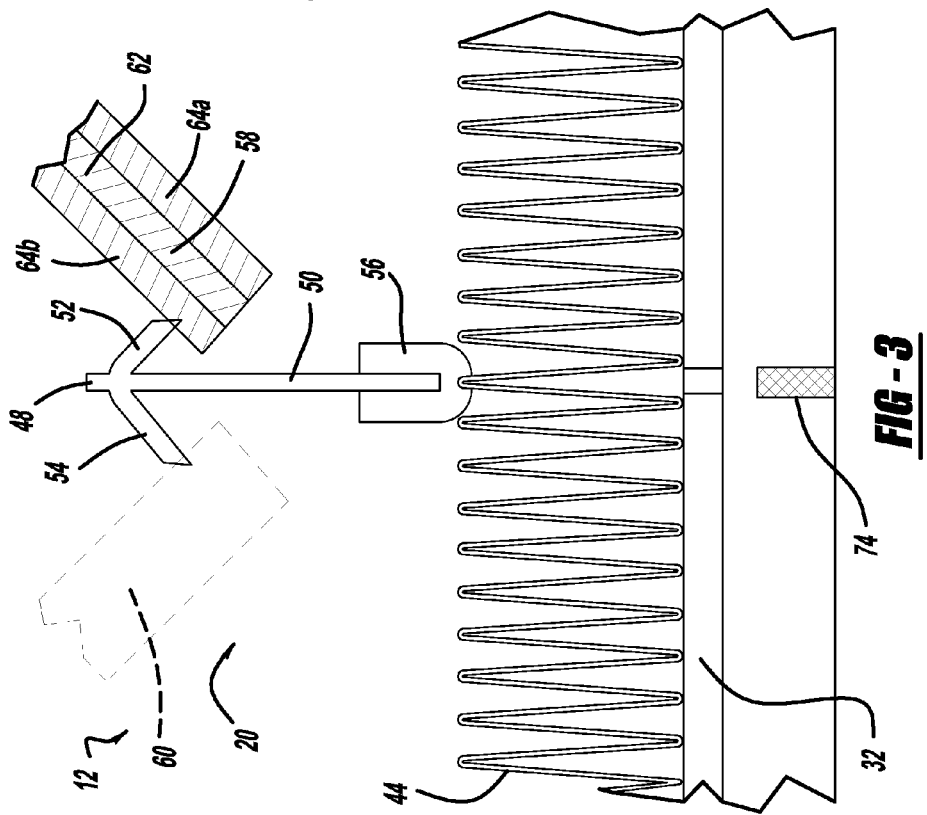

PARTIAL RECIRCULATION VEHICLE HVAC SYSTEM

CROSS-REFERENCE TO RELATED APPLICATIONS

This application is a divisional Application of U.S. patent application Ser. No. 11/385,002 filed on Mar. 20, 2006. The entire disclosure of the above applications is incorporated herein by reference.

FIELD

The present disclosure relates to a vehicle HVAC system, and more particularly relates to a partial recirculation vehicle HVAC system.

BACKGROUND

The statements in this section merely provide background information related to the present disclosure and may not constitute prior art.

It is known to provide heating, ventilation, and air conditioning (HVAC) systems in vehicles. These systems heat and cool the air within the passenger compartment for the comfort of the vehicle passengers. Some vehicle HVAC systems can be selectively configured to change the source of air. In one configuration, the HVAC system draws in air from outside the vehicle, conditions the air, and then pumps the conditioned air into the passenger compartment. In another configuration, the HVAC system draws in air from inside the passenger compartment, conditions the air, and then recirculates the air into the passenger compartment. In still another configuration, the HVAC system draws in a mixture of exterior air and interior air, conditions the mixed air, and then pumps the conditioned air into the passenger compartment. In the "mixture" configuration, the passengers receive a portion of fresh air, which can reduce window fogging and also make riding in the vehicle more pleasant. In the mixture configuration, the passengers receive a portion of recirculated air while fuel economy is increased.

Although these vehicle HVAC systems have worked for their intended purposes, some disadvantages remain. For instance, these HVAC systems typically include an exterior air intake vent through which exterior air enters the system, and these HVAC systems typically include a separate interior air intake vent through which the interior air enters the system. In the "mixture" configuration described above, both the exterior and interior air intake vents are open. As such, it is possible for exterior air to enter through the exterior air intake vent and leak into the passenger compartment through the interior air intake vent. As such, the leaked exterior air enters the passenger compartment before being heated or cooled. This problem is especially likely to occur when the vehicle is traveling at higher rates of speed because the pressure of the exterior air entering the HVAC system (i.e., the "RAM air") is relatively high.

As an example, on a warm day, warm exterior air can enter the HVAC system through the exterior air intake vent and leak into the passenger compartment through the interior air intake vent without being cooled. The warm air thus raises the temperature inside the passenger compartment, making the HVAC system expend more energy to cool the passenger compartment. As a result, fuel economy of the vehicle decreases. Accordingly, there remains a need for an improved HVAC system that draws in a mixture of exterior air and interior air for conditioning and that eliminates the amount of exterior air that leaks into the passenger compartment via the interior air intake vent.

SUMMARY

A blower unit for a vehicle heating, venting, and air conditioning (HVAC) unit is disclosed. The blower unit includes a case member that defines at least one exterior air intake aperture and at least one interior air intake aperture. The blower unit also includes a sealing member, a first door, and a second door. The first and second doors can move independent of each other. The first and second doors can be positioned in a mixture position to allow air flow into the blower unit through both the exterior and interior air intake apertures. The first door in the mixture position is sealed against the sealing member. As such, the first door and the sealing member cooperate to eliminate air flow out of the blower unit through the interior air intake aperture.

In another aspect, a vehicle is disclosed which includes a passenger compartment defining an interior and an exterior. The vehicle includes a heating, venting, and air conditioning unit with a blower unit. The blower unit includes a case member defining at least one exterior air intake aperture in fluid communication with the exterior of the passenger compartment. The case member also defines at least one interior air intake aperture in fluid communication with the interior of the passenger compartment. The blower unit further includes a sealing member, a first door, and a second door. The first and second doors can move independent of each other. The first and second doors can be positioned at a mixture position to allow air flow into the blower unit through both the exterior and interior air intake apertures. The first door, in the mixture position, is sealed against the sealing member such that the first door and the sealing member cooperate to reduce air flow out of the blower unit through the interior air intake aperture.

In still another aspect, a blower unit for a vehicle heating, venting, and air conditioning unit is disclosed. The blower unit includes an upper case member defining an exterior air intake aperture, a first interior air intake aperture, and a second interior air intake aperture. The blower unit also includes a lower case member and a bell mouth member disposed between the upper case member and the lower case member. The blower unit further includes a fan disposed within the lower case member and operable to draw air into the blower unit through the exterior air intake aperture, the first interior air intake aperture, and/or the second interior air intake aperture. The blower unit also includes a sealing member disposed within the upper case member and a first door that is movably coupled to the upper case member. In addition, the blow unit includes a second door that is movably coupled to the upper case member and a filter disposed between the sealing member and the bell mouth member. Furthermore, the blower unit includes at least one flow diverting member that is operatively coupled to the bell mouth member and extends toward the filter. The first and second door move independently of each other between a fresh air position, a recirculating air position, and a mixture position. In the fresh air position, the first door obstructs the first interior air intake aperture and the second door obstructs the second interior air intake aperture. In the recirculating air position, the first and second doors are sealed against the sealing member to thereby cooperate to obstruct the exterior air intake aperture. In the mixture position, the first door is sealed against the sealing member such that the first door, the sealing member, and main body portion cooperate to reduce air flow out of the blower unit through the first interior air intake aperture. The second door, in the mixture position, obstructs the second interior air intake aperture to thereby reduce air flow out of the blower unit through the second interior air intake aperture. Moreover, the flow diverting member is operable to reduce air flow out of the blower unit through the interior air intake aperture.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a sectional view of the blower unit of the HVAC system of FIG. 2;

FIG. 4 is an exploded view of the blower unit of the HVAC system of FIG. 2;

DETAILED DESCRIPTION

Figure 1:
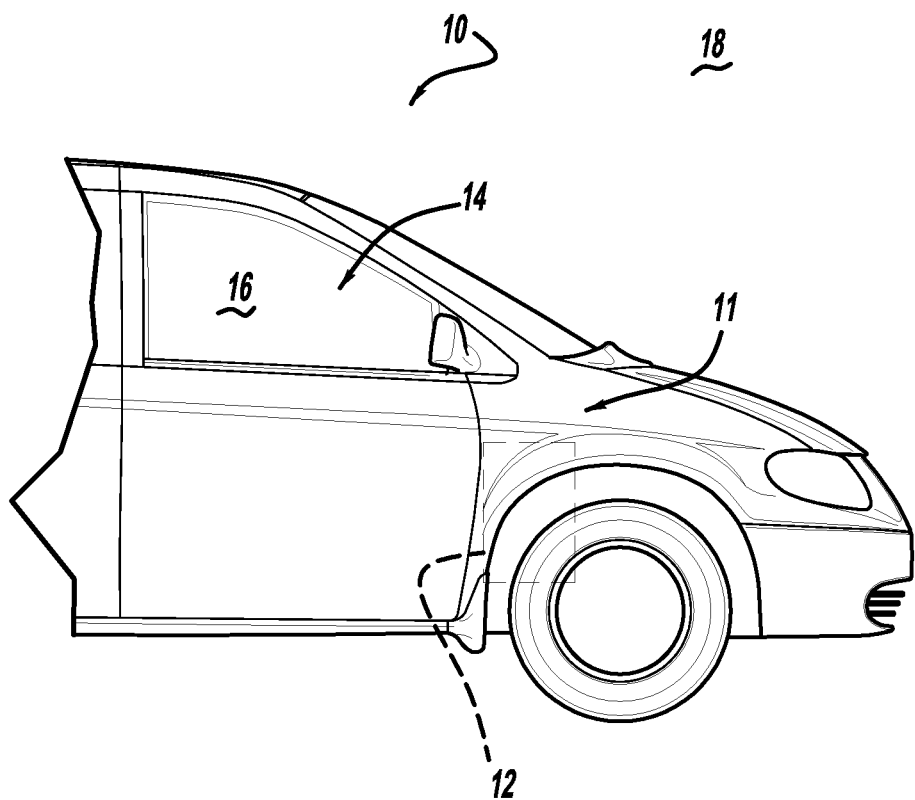
FIG. 1 is a side view of a vehicle with an HVAC system schematically illustrated therein.

The following description is merely exemplary in nature and is not intended to limit the present disclosure, application, or uses. It should be understood that throughout the drawings, corresponding reference numerals indicate like or corresponding parts and features.

Referring initially to FIG. 1, a vehicle 10 is illustrated. The vehicle 10 includes an engine compartment generally indicated at 11. A heating, venting, and air conditioning (HVAC) unit 12 is included within the engine compartment 11 as schematically illustrated in FIG. 1. The vehicle 10 also includes a passenger compartment 14. The passenger compartment 14 defines an interior space 16 within the passenger compartment 14 and an exterior space 18 outside the passenger compartment 14. The HVAC unit 12 heats and/or cools air within the interior space 16 of the passenger compartment 14 in a known manner.

Figure 2:
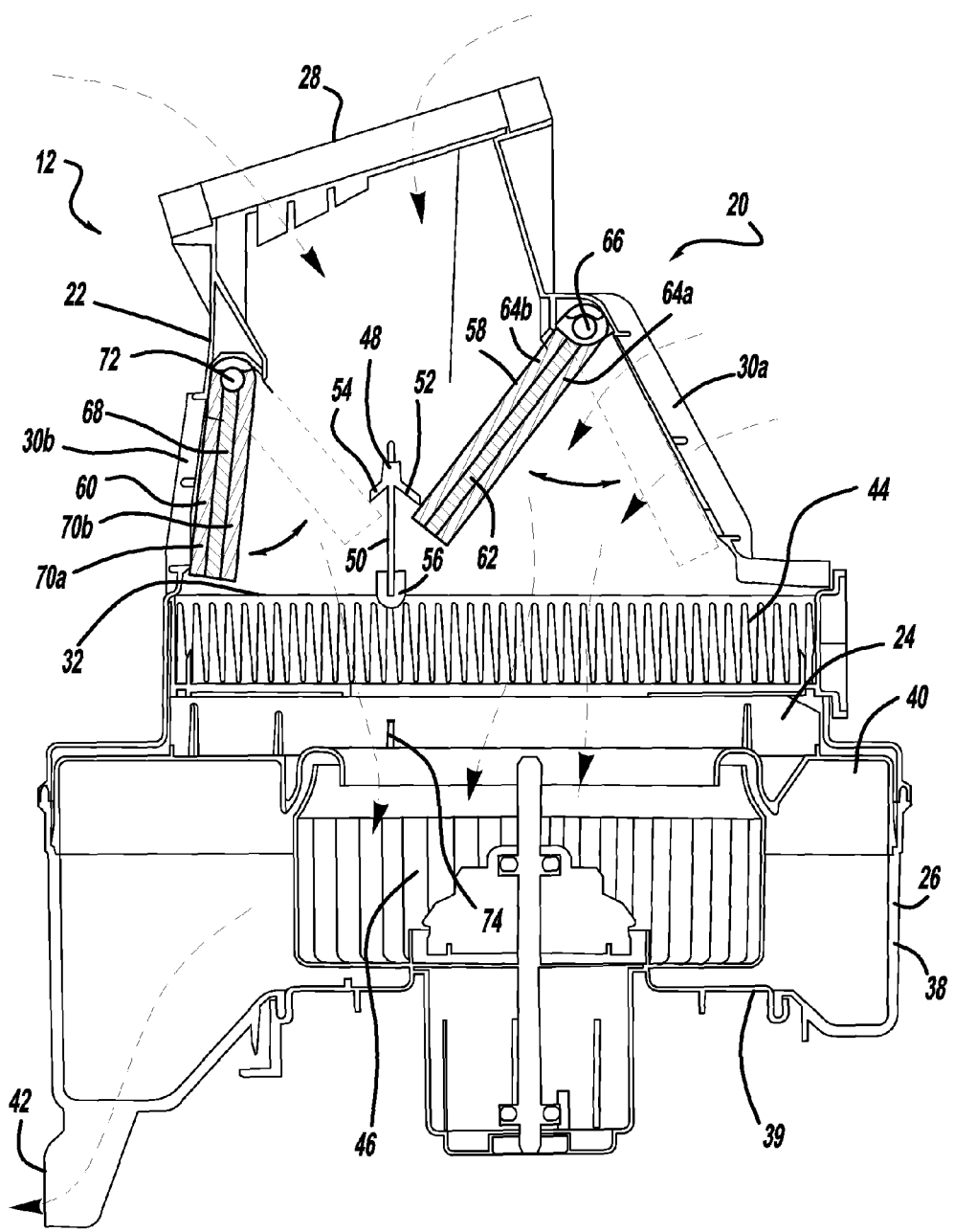
FIG. 2 is a sectional view of a blower unit of the HVAC system of FIG. 1.

Referring now to FIGS. 2, 3 and 4, a blower unit 20 of the HVAC unit 12 is illustrated. In general, the blower unit 20 draws in air from the interior space 16 and/or the exterior space 18, and the blower unit 20 moves the air into a heater unit (not shown) and/or a cooler unit (not shown) such that the air can be heated and/or cooled. Once the air is heated/cooled, the air moves into the interior space 16 for the comfort of the passengers.

As shown in FIGS. 2 and 4, the blower unit 20 generally includes an upper case member 22, a bellmouth member 24, and a lower case member 26. The bellmouth member 24 is disposed between and coupled to the upper case member 22 and the lower case member 26. The upper case member 22, bellmouth member 24, and lower case member 26 can be coupled in any suitable manner. In one embodiment, the upper case member 22, the bellmouth member 24, and the lower case member 26 are each made out of a rigid plastic material. Also, in one embodiment, the upper case member 22, the bellmouth member 24, and the lower case member 26 are manufactured individually by molding processes.

The upper case member 22 is generally hollow and defines an exterior air intake aperture 28 as shown in FIGS. 2 and 4. The exterior air intake aperture 28 is in fluid communication with the exterior space 18 outside the vehicle 10. As such, air in the exterior space 18 is able to enter the blower unit 20 through the exterior air intake aperture 28. The upper case member 22 also defines a first interior air intake aperture 30a and a second interior air intake aperture 30b. The interior air intake apertures 30a, 30b are in fluid communication with the interior space 16 of the passenger compartment 14 of the vehicle 10. As such, air within the interior space 16 is able to enter the blower unit 20 through the interior air intake apertures 30a, 30b. The upper case member 22 further includes a lower opening 32. The lower opening 32 is in fluid communication with the bellmouth member 24.

The bellmouth member 24 is generally flat and ring-shaped as shown in FIG. 4. The bellmouth member 24 includes an upper surface 34, and the bellmouth member 24 also defines a central aperture 36.

The lower case member 26 generally includes an outer wall 38 and a lower wall 39. The outer wall 38 defines an open top end 40, and the bellmouth member 24 substantially covers the top end 40 of the lower case member 26. The lower case member 26 also includes an exhaust port 42. The exhaust port 42 is in fluid communication with a heater unit (not shown) and/or a cooling unit (not shown). As such, air within the blower unit 20 can exit the blower unit 20 through the exhaust port 42 to be heated and/or cooled.

As shown in FIGS. 2 and 3, the blower unit 20 also includes a filter 44. The filter 44 is supported by the upper case member 22 adjacent the lower opening 32 and substantially covers the lower opening 32. As such, dust and any other particulate matter is filtered out of the air as it passes from the upper case member 22 to the bellmouth member 24.

The blower unit 20 further includes a fan 46. The fan 46 can be of any suitable type. In the embodiment shown in FIGS. 2 and 4, the fan 46 is disposed within the lower case member 26. The fan 46 is operable to draw air into the blower unit 20 through the exterior air intake aperture 28 and/or the interior air intake apertures 30a and 30b.

More specifically, operation of the fan 46 can cause air to enter the blower unit 20 through the exterior air intake aperture 28 and/or the interior air intake apertures 30a, 30b. That air then moves through the filter 44, and any particulate matter is filtered out. Next, the air moves through the lower opening 32 of the upper case member 22 and then through the central aperture 36 of the bellmouth member 24. The fan 46 then sucks the air into the lower case member 26, and then the fan 46 pushes the air out the exhaust port 42 toward the heater unit or the cooling unit (not shown).

The blower unit 20 further includes a sealing member 48 as shown in FIGS. 2 and 3. The sealing member 48 includes a main body portion 50, which is generally thin and flat and axially straight. The main body portion 50 is disposed within the upper case member 22 near the lower opening 32. The main body portion 50 is integrally attached at both ends to the upper case member 22 in one embodiment. Also, in the embodiment shown, the main body portion 50 is oriented generally perpendicular to the upper surface 34 of the bellmouth member 24. The sealing member 48 further includes a first arm 52 and a second arm 54. The first and second arms 52, 54 are attached along opposite sides of the main body 50 of the sealing member 48. In the embodiment shown, the first and second arms 52, 54 extend away from the main body 50 downward at an angle toward the bellmouth member 24. Also, the first and second arm 52, 54 extend along substantially the entire axial length of the main body 50. Furthermore, in one embodiment, the first arm 52, the second arm 54, and the main body portion 50 are made out of a hard plastic and are integrally attached through a molding process. As shown in FIGS. 2 and 3, the sealing member 48 further includes a compressible member 56. The compressible member 56 is made out of a compressible material, such as foam. The compressible member 56 is attached to the main body portion 50 at an end that is opposite to the first and second arms 52, 54. As shown in FIGS. 2 and 3, the compressible member 56 abuts against the filter 44. As shown, a portion of the compressible member 56 compresses due to the abutment of the filter 44 to thereby create a seal between the sealing member 48 and the filter 44. As such, air is unlikely to pass between the sealing member 48 and the filter 44.

As shown in FIGS. 2 and 3, the blower unit 20 further includes a first door 58 and a second door 60. In the embodiment shown, the first and second doors 58, 60 are each generally flat and axially straight. The first door 58 includes a core member 62 and a compressible member 64a, 64b, coupled on opposite sides of the core member 62. In one embodiment, the core member 62 is made of a hard plastic, and the compressible members 64a, 64b are made out of foam. The first door 58 is movably coupled to the upper case member 22. In the embodiment shown, for instance, the first door 58 is pivotally coupled to the upper case member 22 by at least one pin 66. Thus, as shown in FIG. 2, the first door 58 is able to pivot about the pin 66 between the sealing member 48 and the first interior air intake aperture 30a.

The second door 60 is largely similar to the first door 58. More specifically, the second door 60 includes a core member 68 made out of hard plastic and collapsible members 70a, 70b made out of foam and coupled to the core member 68 on opposite sides. Also, the second door 60 is movably coupled to the upper case member 22. More specifically, the second door 60 is pivotally attached to the upper case member 22 by at least one pin 72. Thus, the second door 60 is able to pivot about the pin 72 between the sealing member 48 and the second interior air intake aperture 30b.

The first and second door 58, 60 can move independent of each other. The first and second door 58, 60 can be actuated about the respective pins 66, 72 in any suitable manner, such as one or more motors.

Figure 5:
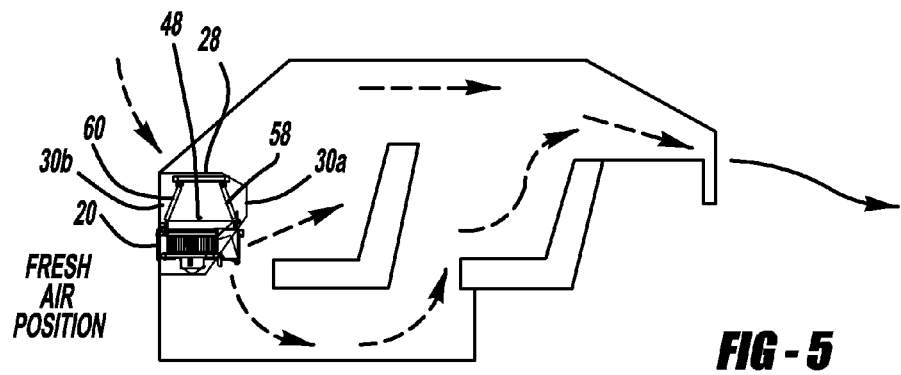
FIG. 5 is a schematic view of a passenger compartment of a vehicle and the blower unit of the HVAC system of FIG. 2 shown in a "Fresh Air" position.
Figure 6:
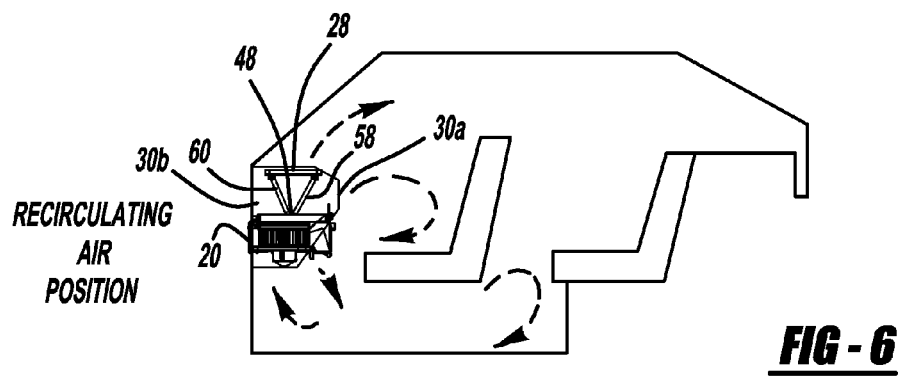
FIG. 6 is a schematic view of a passenger compartment of a vehicle and the blower unit of the HVAC system of FIG. 2 shown in a "Recirculating Air" position.
Figure 7:
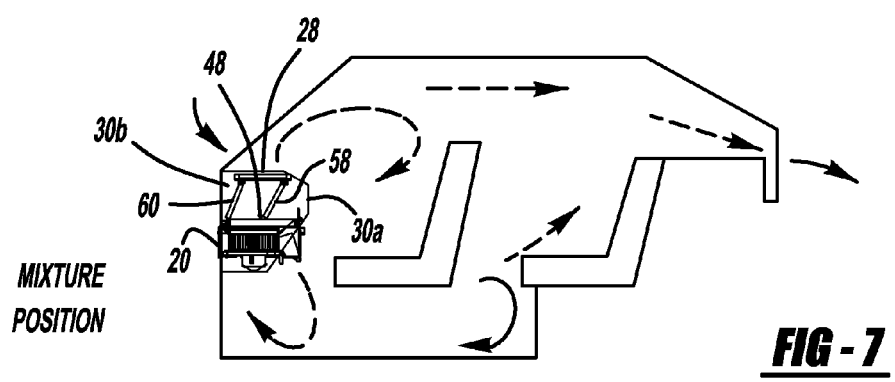
FIG. 7 is a schematic view of a passenger compartment of a vehicle and the blower unit of the HVAC system of FIG. 2 shown in a "Mixture" position.

The first and second doors 58, 60 can be moved between a fresh air position (FIG. 5), a recirculating air position (FIG. 6), and a mixture position (FIG. 7). In the fresh air position, the first door 58 obstructs the first interior air intake aperture 30a and the second door 60 obstructs the second interior air intake aperture 30b. More specifically, the first door 58 is disposed against the upper case member 22 such that the compressible member 64a deforms to create a seal at the periphery of the first interior air intake aperture 30a. In addition, the second door 60 is disposed against the upper case member 22 such that the compressible member 70a deforms to create a seal at the periphery of the second interior air intake aperture 30b. As such, air is able to enter the blower unit 20 through the exterior air intake aperture 28, and air is unlikely to enter the blower unit 20 through the interior air intake aperture 30a and 30b. More specifically, air is able to enter the blower unit 20 through the exterior air intake aperture 28 and flow on either side of the sealing member 48, through the filter 44, through the bellmouth member 24, through the lower case member 26, and out of the blower unit 20 through the exhaust port 42. In this manner, the exterior air introduced into the interior of the vehicle 10 will be fresh, and thus enjoyable for passenger breathing comfort.

When the first and second doors 58, 60 are in the recirculating air position (FIG. 6), the first and second doors 58, 60 are sealed against the sealing member 48 to thereby cooperate to obstruct the exterior air intake aperture 28. More specifically, the first door 58 abuts against the first arm 52 of the sealing member 48, which deforms the compressible member 64b of the first arm 58 to thereby create a seal as shown in FIG. 3. Likewise, the second door 60 abuts against the second arm 54 of the sealing member 48, which deforms the compressible member 70b to create a seal. As such, when the first and second doors 58, 60 are in the recirculating air position, air is able to enter the blower unit 20 through the interior air intake apertures 30a and 30b, flow through the filter 44, through the bellmouth and lower case members 24, 26, and out of the blower unit 20 through the exhaust port 42. It will appreciated that when the first and doors 58, 60 are in the recirculating air position, the HVAC unit 12 can operate more efficiently to thereby conserve fuel.

When the first and second doors 58, 60 are in the mixture position (FIG. 7), the second door 60 obstructs the second interior air intake aperture 30b, and the first door 58 is sealed against the sealing member 48. More specifically, the first door 58 abuts against the first arm 52 of the sealing member 48, which deforms the compressible member 64b to thereby create a seal. Also, the second door 60 seals the second interior air intake aperture 30b similar to the position of the second door 60 in the fresh air position described above. As such, air is able to enter the blower unit 20 through both the exterior air intake aperture 28 and the first interior air intake aperture 30a. Then the air flows through the filter 44, through the bellmouth member 24, through the lower case member 26, and out of the blower unit 20 through the exhaust port 42.

It will be appreciated that the first door 58 and the sealing member 48 cooperate to reduce air flow out of the blower unit through the first interior air intake aperture 30a because the first door 58 is sealed against the sealing member 48. In one embodiment, the first door 58, the sealing member 48, the main body portion 50, and the compressible member 56 prevent substantially all air flow out of the blower unit through the first interior air intake aperture 30a. As such, air is unlikely to leak into the passenger compartment 14 from the exterior 18 of the vehicle 10 without first being heated or cooled by the HVAC unit 12. This, in turn, causes the HVAC unit 12 to work more efficiently and conserve fuel for the vehicle 10.

The blower unit 20 further includes at least one flow diverting member 74. As shown in FIGS. 2 and 4, the flow diverting member 74 are flat and axially straight. The flow diverting members 74 are integrally coupled to the bellmouth member 24 on the upper surface 34 of the bellmouth member 24 in one embodiment. As shown in FIG. 4, the flow diverting members 74 are disposed on opposite sides of the central aperture 36, and extend radially therefrom. As shown in FIG. 2, the flow diverting members 74 are operable to limit air flow out of the blower unit 20 through the first interior air intake aperture 30a. More specifically, when the first and second doors 58, 60 are in the mixture position, the air entering the exterior air intake aperture 28 flows between the second door 60 and the sealing member 48. As the air flows through the filter 44, the flow diverting members 74 direct the air through the central aperture 36 of the bellmouth member 24 instead of allowing the air to leak upstream through the filter 44 and out the first interior air intake aperture 30*a*. As such, air is unlikely to enter the passenger compartment 14 of the vehicle without first being heated or cooled by the HVAC unit 12. This allows for increased efficiency of the HVAC unit 12 and increased fuel economy of the vehicle 10.

What is claimed is:

1. A blower unit for a vehicle heating, venting, and air conditioning unit comprising:
    a case member defining an exterior air intake aperture, the case member having a first periphery defining a first interior air intake aperture and having a second periphery defining a second interior air intake aperture;
    a sealing member in contact with a filter;
    a first door having a first side and a second side opposite to the first side; and
    a second door having a first side and a second side opposite to the first side,
    wherein the first and second doors can move independent of each other, the sealing member is between the first door and the second door;
    the first side of the first door can abut the first periphery to obstruct the first interior air intake aperture,
    the first side of the second door can abut the second periphery to obstruct the second interior air intake aperture,
    the second side of the second door can abut the sealing member;
    the first and second doors can be positioned in a mixture position to allow airflow into the blower unit through the exterior air intake aperture and at least one of the first interior air intake aperture and the second interior air intake aperture, and
    the second side of the first door, in the mixture position, abuts the sealing member to be sealed against the sealing member such that the first door and the sealing member cooperate to reduce airflow out of the blower unit through the exterior air intake aperture;
    wherein:
        the case member further defines a lower opening;
        the lower opening can communicate with the exterior air intake aperture;
        the lower opening can communicate with the first interior air intake aperture;
        the lower opening can communicate with the second interior air intake aperture;
        the filter is disposed between the lower opening and the exterior air intake aperture;
        the sealing member is fixedly attached to the case member at a position between the lower opening and the exterior air intake opening and between the first periphery and the second periphery;
        the sealing member directly abuts the filter to portion the lower opening into a first portion and second portion;
        the sealing member includes a main body portion, which is flat and axially straight;
        the main body portion is integrally attached at both ends to the case member;
        the sealing member further includes a first arm and a second arm;
        the first and second arms are attached along opposite sides of the main body portion;
        the first and second arms extend away from the main body portion at an angle toward the filter;
        the first door, in the mixture position, is sealed against the first arm;
        the sealing member further includes a compressible member attached to the main body portion at an end that is opposite to the first and second arms;
        the compressible member abuts against the filter to create a seal between the sealing member and the filter;
        the first door includes compressible members coupled on the opposite sides of the first door;
        when the first door abuts against the first periphery, the first periphery deforms one of the compressible members on the one side of the first door; and
        when the first door abuts against the sealing member, the sealing member deforms another of the compressible members on the other side of the first door.

2. The blower unit of claim 1, wherein the sealing member is located distant from both the first periphery and the second periphery.

3. The blower unit of claim 1, wherein the sealing member is located between the first periphery and the second periphery.

4. The blower unit of claim 1, wherein when the first door abuts the sealing member, the first door is distant from the first periphery,
    when the first door abuts the first periphery, the first door is distant from the sealing member,
    when the second door abuts the sealing member, the second door is distant from the second periphery, and
    when the second door abuts the second periphery, the second door is distant from the sealing member.

5. The blower unit of claim 1, wherein the first door can abut the first periphery to create a seal at the first periphery, and
    the second door can abut the second periphery to create a seal at the second periphery.

6. The blower unit of claim 1, wherein the filter is supported by the case adjacent the lower opening and covers the lower opening.

* * * * *